United States Patent
Tsukui

(10) Patent No.: US 8,666,220 B2
(45) Date of Patent: *Mar. 4, 2014

(54) RECORDING/REPRODUCING APPARATUS AND METHOD OF CONTROLLING THE APPARATUS

(75) Inventor: Katsuyuki Tsukui, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 464 days.

This patent is subject to a terminal disclaimer.

(21) Appl. No.: 12/961,365

(22) Filed: Dec. 6, 2010

(65) Prior Publication Data

US 2011/0075984 A1 Mar. 31, 2011

Related U.S. Application Data

(63) Continuation of application No. 11/373,665, filed on Mar. 10, 2006, now Pat. No. 7,885,511.

(30) Foreign Application Priority Data

Mar. 16, 2005 (JP) ................. 2005-075374

(51) Int. Cl.
| | |
|---|---|
| H04N 5/77 | (2006.01) |
| H04N 5/44 | (2011.01) |
| H04N 5/76 | (2006.01) |
| H04N 5/84 | (2006.01) |
| H04N 5/222 | (2006.01) |
| H04N 5/225 | (2006.01) |
| H04N 5/228 | (2006.01) |
| H04N 5/262 | (2006.01) |
| H04N 9/64 | (2006.01) |
| H04N 9/083 | (2006.01) |
| G03B 7/26 | (2006.01) |
| G03B 17/00 | (2006.01) |
| G03B 17/24 | (2006.01) |
| G06F 3/00 | (2006.01) |
| G06K 9/34 | (2006.01) |
| G06K 9/36 | (2006.01) |

(52) U.S. Cl.
USPC ..... 386/225; 386/333; 348/220.1; 348/222.1; 348/231.2; 348/231.3; 348/239; 348/333.02; 348/333.05; 348/333.12; 348/335; 348/372; 348/559; 348/576; 382/173; 382/233; 396/277; 396/279; 396/297; 396/299; 396/317; 715/723

(58) Field of Classification Search
USPC ............. 386/120, E5.024, E5.072, 121, 224, 386/235, E5.069; 348/220.1, 222.1, 231.2, 348/231.3, 231.9, 239, 272, 294, 333.02, 348/333.05, 333.12, 335, 372, E5.043, 348/E5.042, E9.01, 333.04, 559, 576; 358/906; 396/277, 279, 297, 299, 317; 715/723; G9B/27.012, 27.019; 345/555; 375/E7.049, E7.062, E7.064, 375/E7.065, E7.141, E7.182; 382/173, 233

See application file for complete search history.

(56) References Cited

U.S. PATENT DOCUMENTS 5,070,406 A * 12/1991 Kinoshita ..................... 348/294
5,129,011 A * 7/1992 Nishikawa et al. .......... 382/173

(Continued)

*Primary Examiner* — Thai Tran
*Assistant Examiner* — Syed Hasan
(74) *Attorney, Agent, or Firm* — Canon USA Inc IP Division

(57) ABSTRACT

A recording/reproducing apparatus includes an operating section having dual functions depending on being in an image capture mode or in a reproduction mode respectively. While one of the recording mode and the reproduction mode is being carried out, in response to start of the other mode, a controlling function of the operating section is switched to the function of the other mode, and in response to the completion of the other mode, the function of the operating section is switched to the function of the one mode.

6 Claims, 6 Drawing Sheets

(56) References Cited

U.S. PATENT DOCUMENTS

| | | | |
|---|---|---|---|
| 5,903,785 A * | 5/1999 | Ishiguro et al. | 396/277 |
| 5,963,204 A * | 10/1999 | Ikeda et al. | 715/723 |
| 6,753,916 B2 * | 6/2004 | Saito | 348/333.01 |
| 7,092,023 B2 * | 8/2006 | Hayashi | 348/333.05 |
| 7,324,136 B2 * | 1/2008 | Kubo | 348/220.1 |
| 7,411,623 B2 * | 8/2008 | Shibutani | 348/333.02 |
| 2002/0005909 A1 * | 1/2002 | Sato | 348/559 |

* cited by examiner

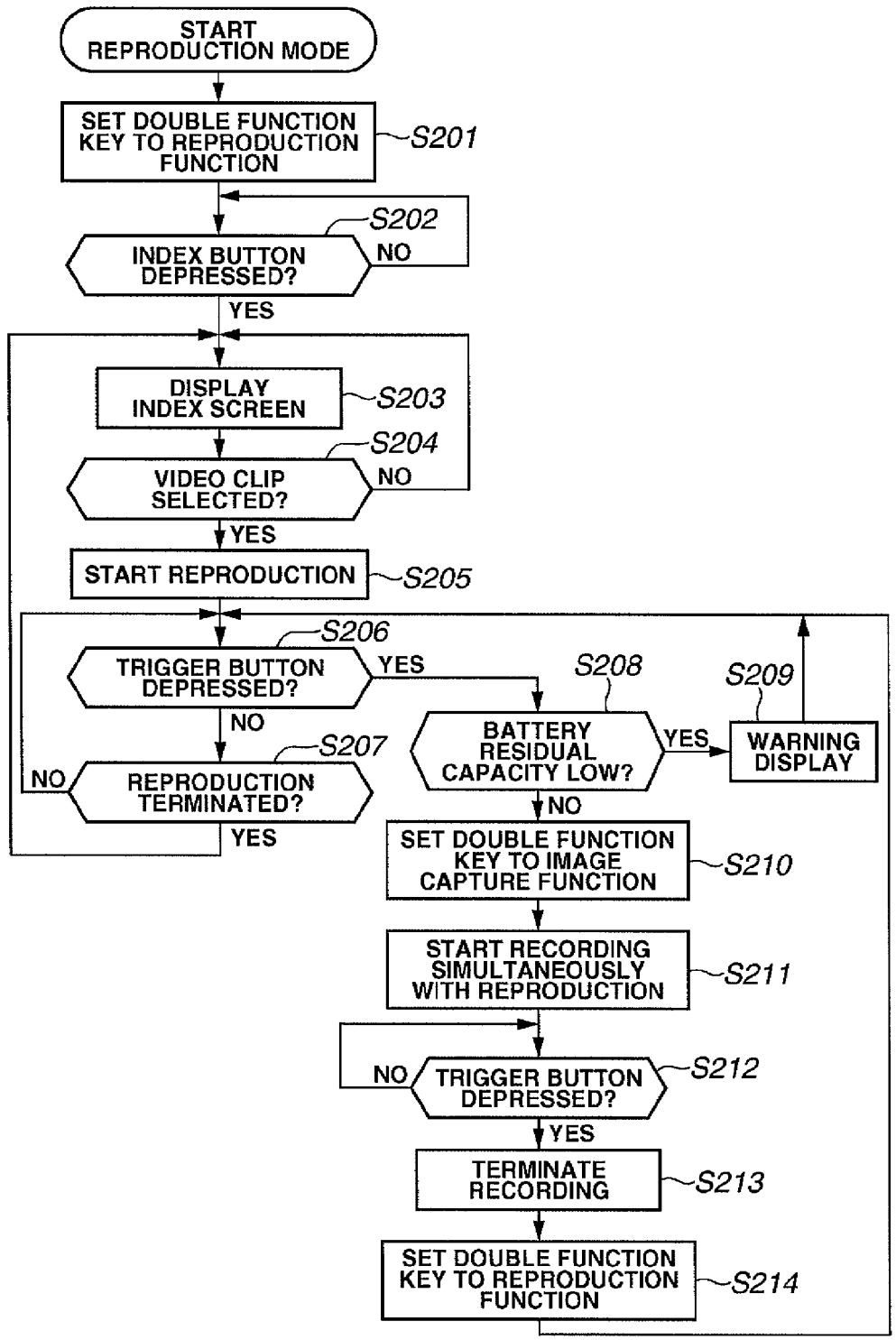

RECORDING/REPRODUCING APPARATUS AND METHOD OF CONTROLLING THE APPARATUS

CROSS-REFERENCE TO RELATED APPLICATIONS

This application is a continuation of U.S. patent application Ser. No. 11/373,665 filed Mar. 10, 2006, which claims priority from Japanese Patent Application No. 2005-075374 filed Mar. 16, 2005, all of which are hereby incorporated by reference herein in their entirety.

BACKGROUND OF THE INVENTION

1. Field of the Invention

The present invention relates to a recording/reproducing apparatus and a control method of the apparatus, and more specifically, to a user interface used in an apparatus capable of simultaneously recording and reproducing moving images or still images.

2. Description of the Related Art

In recent years, the capacity of recording media such as disk media has increased rapidly, and there have been apparatuses configured to record and reproduce a video signal as well as audio signal for long hours. At a consumer level, the apparatuses employ an image format of high-efficient encoding process such as MPEG (Moving Picture Experts Group), and techniques for recording more than one hour at a compression data rate of about 4 Mbps to 10 Mbps have been developed.

For example, there is an apparatus which utilizes a magnetic optical disk in a video recorder equipped with a camera device (hereinafter, referred to as video camera). Japanese patent application laid-open No. 7-255028 discusses a video camera apparatus capable of recording a large amount of video data in high density, and making it randomly accessible at a high speed.

On the other hand, Japanese patent application laid-open No. 2002-314916 (corresponding to U.S. Pat. No. 6,919,925) discusses a video camera which exploits a randomly accessible feature in the video camera. In the structure disclosed in Japanese patent application laid-open No. 2002-314916, when an image signal recorded at a certain position on a recording medium is reproduced while an image signal is recorded, the image signal to be recorded and the image signal to be reproduced can be displayed respectively.

However, in conventional video cameras capable of simultaneously recording an image signal on a disk and reproducing an image signal, it is necessary to provide operating sections dedicated for recording and reproducing respectively. Accordingly, a size of the video camera body can become large. Further, when the recording and the reproducing are simultaneously performed in a video camera, power consumption of the video camera increases. However, the user would not consider the increase of power consumption when operating the video camera. Accordingly, if the recording and the reproduction are simultaneously performed, a battery residual capacity can suddenly decrease to zero, and both of the recording and the reproducing would be terminated half-way.

SUMMARY OF THE INVENTION

The present invention is directed to a recording/reproducing apparatus and a control method thereof.

The present invention is directed to a recording/reproducing apparatus comfortably operable when a recording mode and a reproduction mode are simultaneously carried out without special operating sections for image capturing and reproducing respectively, and a control method of the apparatus.

Further, the present invention is directed to an image capturing apparatus comfortably operable and capable of simultaneously carrying out an image capture mode and a reproduction mode only when a battery residual capacity remains sufficient.

In one aspect of the present invention, a recording/reproducing apparatus capable of recording and reproducing substantially at the same time includes a recording unit configured to record an information signal on a recording medium, a reproducing unit configured to reproduce the information signal recorded on the recording medium, a mode designation switch facilitating designating one of a recording mode and a reproduction mode, a double-function operating key capable of performing different operations depending on one of the recording mode and the reproduction mode respectively, and a controller controlling the recording unit and the reproducing unit in response to the operation of the double-functional operating key. While in one of the recording and reproduction modes designated by the mode designation switch, if the other one of the recording and reproduction modes is carried out, the controller switches the function of the double-functional operating key to the function effective for the other one of the recording and reproduction modes, and in response to canceling of the other one of the recording and reproduction modes, the controller switches the function of the double-functional operating key to the function effective for the one of the recording and reproduction modes designated by the mode designation switch.

In another aspect of the present invention, a control method of a recording/reproducing apparatus capable of recording and reproducing substantially at the same time includes a step of recording an information signal on a recording medium, a step of reproducing the information signal recorded on the recording medium, a step of designating the recording step or the reproducing step, a step of performing the function of one operating step of the recording step and the reproducing step designated in the designating step by using an operating key, and a simultaneous operating step of performing the one operating step of the recording and the reproducing steps while the other operating step designated in the designating step is being performed. When the simultaneous operating step is performed, the operating step performs the function related to the operating step which is not designated in the designating step, and in response to canceling the simultaneously operating step, the operating step performs the function related to the operating step designated in the designating step.

In still another aspect of the present invention, an image capturing apparatus capable of recording and reproducing substantially at the same time includes a camera unit configured to capture an image of an object and to generate an image signal, a recording unit configured to record the image signal on a randomly accessible recording medium, a reproducing unit configured to reproduce the image signal recorded on the recording medium, a mode designation switch facilitating designating one of an image capture mode and a reproduction mode, a double-functional operating key capable of performing different functions depending on the recording mode and the reproduction mode respectively, and a controller controlling the camera unit, the recording unit, and the reproducing unit in response to an operation of the operating key. While in one of the recording and reproduction modes designated by the mode designation switch, if the other one of the recording and reproduction modes is carried out, the controller switches the function of the double-functional operating key to the function effective for the other one of the recording and reproduction modes, and in response to canceling the other one of the recording and reproduction modes, the controller switches the function of the double-functional operating key to the function effective for the one of the recording and reproduction modes designated by the mode designation switch.

In still another aspect of the present invention, an image capturing apparatus capable of recording and reproducing substantially at the same time includes a camera unit configured to capture an image of an object and to generate an image signal, a recording unit configured to record the image signal on a randomly accessible recording medium, a reproducing unit configured to reproduce the image signal recorded on the recording medium, a mode designation switch facilitating designating one of an image capture mode and a reproduction mode, a double-functional operating key capable of performing different functions depending on the recording mode and the reproduction mode respectively, a battery, and a controller controlling the camera unit, the recording unit, and the reproducing unit according to a residual capacity of the battery and an operation of the double-functional operating key. While in one of the recording and reproduction modes designated by the mode designation switch, if the other one of the recording and reproduction modes is carried out, the controller determines according to the residual capacity of the battery whether the other one of the recording and reproduction modes can be carried out, and if the other one of the recording and reproduction modes can be carried out, performs the other one of the recording and reproduction modes and switches the function of the double-functional operating key to the function effective for the other one of the recording and reproduction modes.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIG. 7 is a flow chart illustrating a processing procedure in a reproduction mode according to the exemplary embodiment of the present invention.

DETAILED DESCRIPTION OF THE EXEMPLARY EMBODIMENTS

Exemplary embodiments of the invention will be described in detail below with reference to the drawings.

Figure 1:
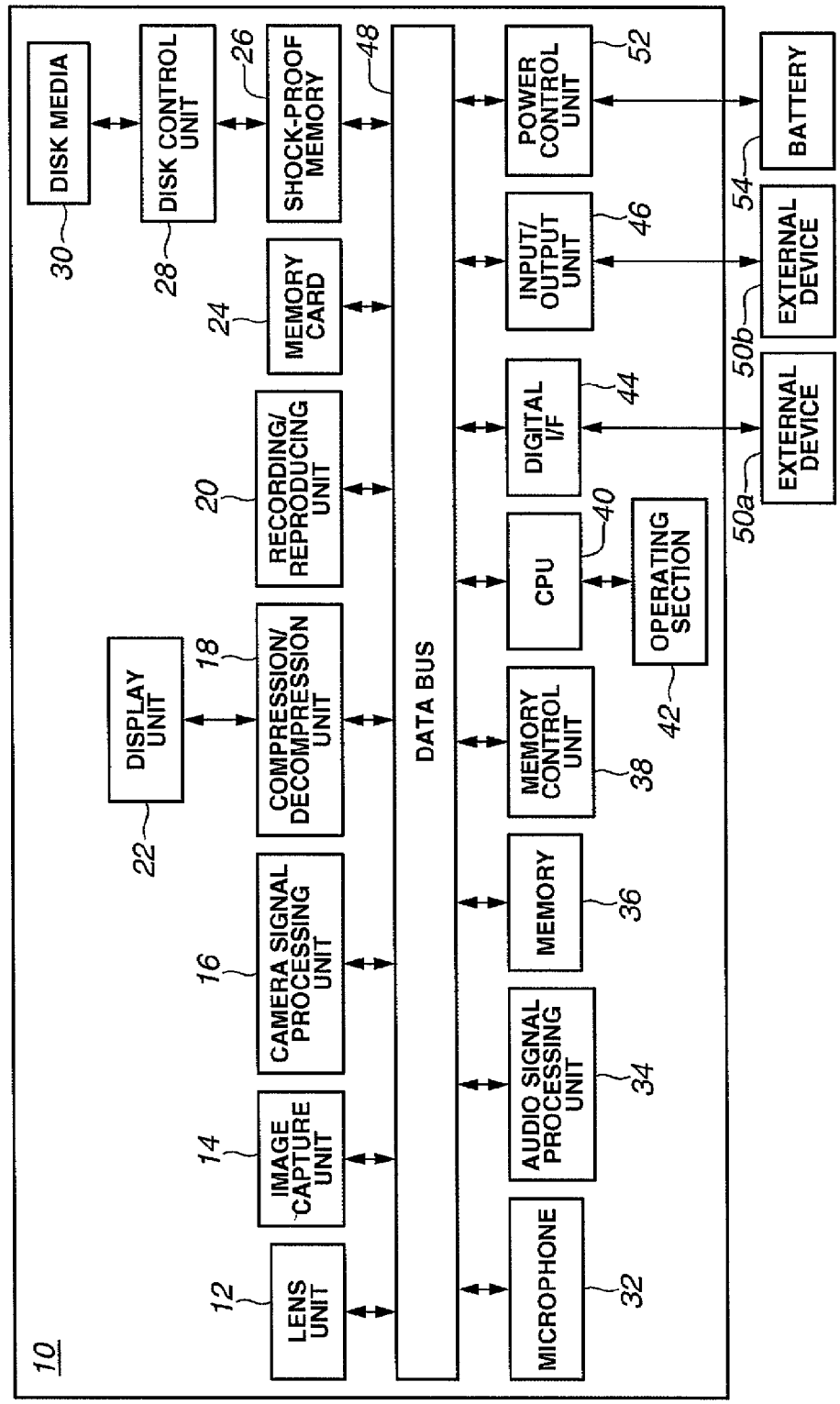
FIG. 1 is a block diagram illustrating the schematic structure of a video recorder equipped with a camera device (video camera) according to an exemplary embodiment of the present invention.
Figure 2:
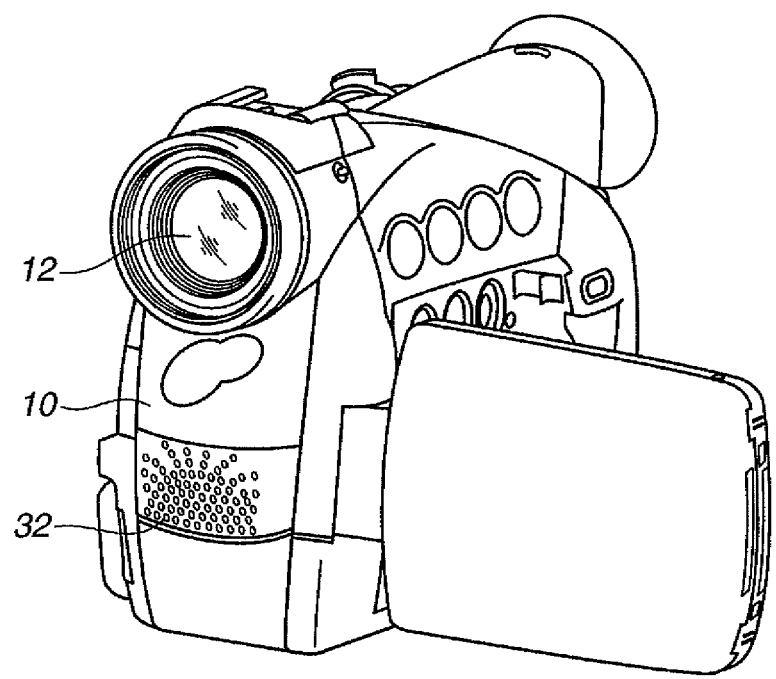
FIG. 2 is a perspective view illustrating a video camera according to the exemplary embodiment of the present invention viewed from the front (object) side.
Figure 3:
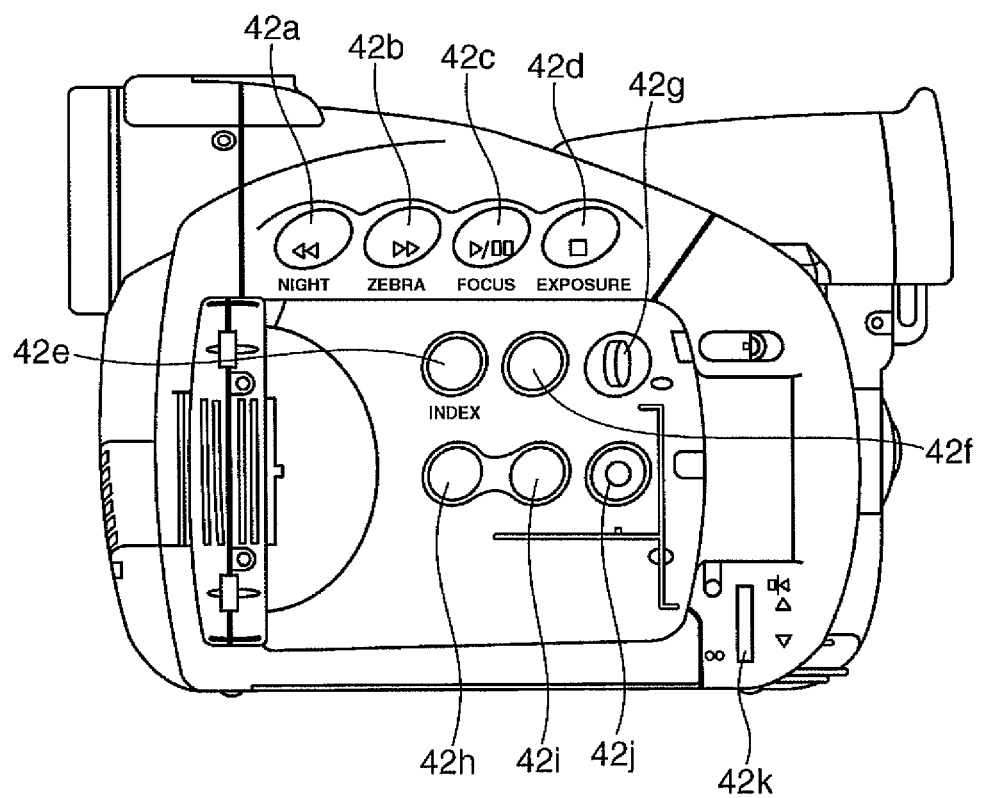
FIG. 3 is a perspective view illustrating a video camera according to the exemplary embodiment of the present invention viewed from the right (operating section) side.
Figure 4:
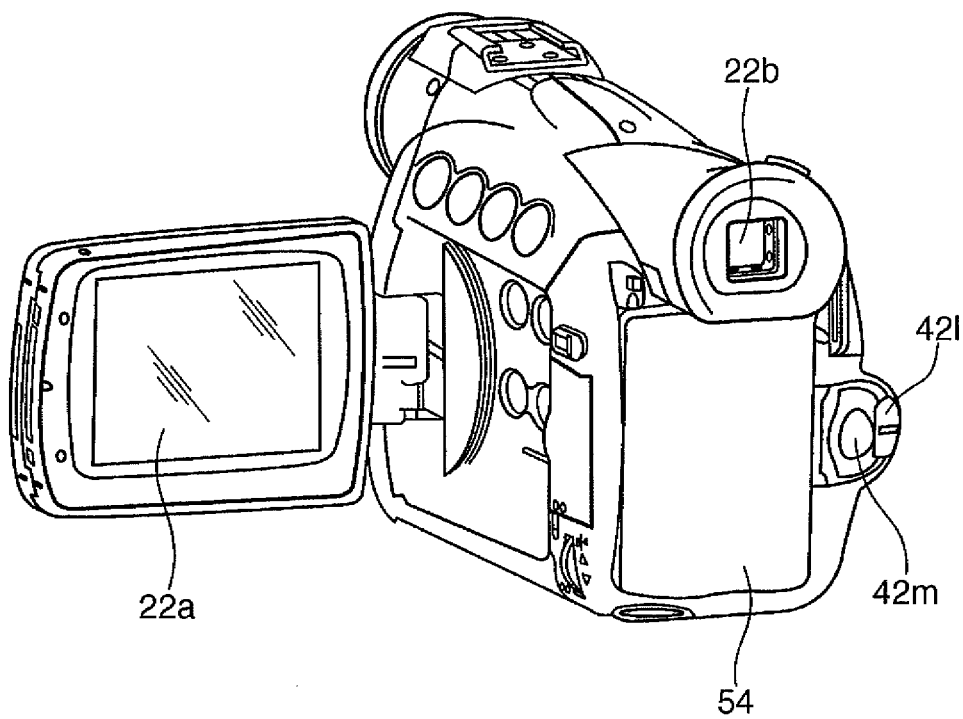
FIG. 4 is a perspective view illustrating a video camera according to the exemplary embodiment of the present invention viewed from the rear (user) side.

FIG. 1 is a block diagram illustrating a schematic structure of a video recorder equipped with a camera device (video camera) according to an exemplary embodiment of the present invention. FIG. 2 is a perspective view of the video camera viewed from a front (object) side, FIG. 3 is a perspective view of the video camera viewed from a right (operating section) side, and FIG. 4 is a perspective view of the video camera viewed from a rear (user) side according to the exemplary embodiment of the present invention.

The structure of the exemplary embodiment will be described with reference to FIG. 1 and FIG. 2. A video camera body 10 includes a lens unit 12 having an aperture and optical lens groups which include an optical control system such as for focusing and zooming. The video camera body also includes an image capture unit 14 having a charge coupled device (CCD) imaging element, a camera signal processing unit 16, a compression/decompression unit 18, a recording/reproducing unit 20, a display unit 22, a memory card 24, a shock-proof memory 26, a disk control unit 28, a disk medium 30, a microphone 32, an audio signal processing unit 34, a memory 36, a memory control unit 38, a central processing unit (CPU) 40, an operating section 42, a digital interface (I/F) 44, an input/output unit 46, a data bus 48, and a power control unit 52. Each of functional blocks 12 to 46 and 52 is connected via the data bus 48. The memory 36 is used by each function block in a time sharing manner, and controlled and managed by the memory control unit 38. The CPU 40 centrally controls the video camera body 10 by executing predetermined programs or using other means. The power control unit 52 is connected to a battery 54, and the power is supplied from the battery 54 to activate the video camera body 10.

The function of the operating section 42 will be described with reference to FIG. 3 and FIG. 4. The operating section 42 has double-function keys 42a, 42b, 42c, and 42d, and operating keys, buttons, or dials 42e to 42m. By operating the operating section 42, a user can instruct the CPU 40 to perform a corresponding operation. The double function keys 42a, 42b, 42c, and 42d of the operating section 42 are assigned different functions in the image capture mode and in the reproduction mode respectively. That is, these keys are shared and have different functions in the image capture mode and in the reproduction mode.

For example, in the image capture mode, the key 42a functions as a night mode key which instructs the CPU 40 to automatically adjust a shutter speed depending on the brightness of an object. On the other hand, in the reproduction mode, the key 42a functions as a reverse key which instructs the CPU 40 to backwardly send recorded images.

As to the key 42b, in the image capture mode, the key functions as a zebra mode key which instructs the CPU 40 to output striped patterns to grasp the image detail and clarity which is lost by image processing, and in the reproduction mode, functions as a forward key which instructs the CPU 40 to forwardly send recorded images.

The key 42c, in the image capture mode, functions as a manual focus designation key which instructs the CPU 40 to switch to a manual focus mode, and in the reproduction mode, functions as a reproduction/pause key which instructs the CPU 40 to play or pause by the toggle operation.

The key 42d, in the image capture mode, functions as an exposure designation key which instructs the CPU 40 to switch the exposure to a proper value, and in the reproduction mode, functions as a stop key which instructs the CPU 40 to stop the reproduction.

The index button 42e instructs the CPU to cause the display unit 22 to display an index screen for reproduction. The slide show button 42f instructs the CPU 40 to start a slide show of reproduction images. The manual/auto switch 42g instructs the CPU 40 to change over between manual and auto in the image capture mode. The digital effect button 42h instructs the CPU 40 to select a digital effect. The digital effect on/off button 42i instructs the CPU 40 to turn on and off the digital effect.

The menu button 42j instructs the CPU 40, in the image capture mode, to display a menu related to the image capture operation, and in the reproduction mode, to display a menu related to the reproduction operation. The multi-dial 42k is used to instruct the CPU 40 to select each item by the rotary operation and make determination by the depressing operation.

The mode dial 42l is used to instruct the CPU 40 to switch among a power-off mode, an image capture mode, or a reproduction mode. In the mode dial 42l, the power-off mode is used to turn off the main power supply of the video camera. The image capture mode is mainly used to capture images. The reproduction mode is used to reproduce, edit, or delete image data recorded on the memory card 24 or the disk medium 30.

The trigger button 42m instructs the CPU 40 to start or stop image capturing. The trigger button 42m implements the same function in image capture mode and the reproduction mode. More specifically, in the image capture mode, each time the trigger button 42m is depressed, the CPU 40 alternately generates an event to start recording or to stop recording. In the reproduction mode, each time the trigger button 42m is depressed, the CPU 40 alternately generates an event to start recording or to stop recording without being interrupted even if a reproduction operation is being performed.

Figure 5:
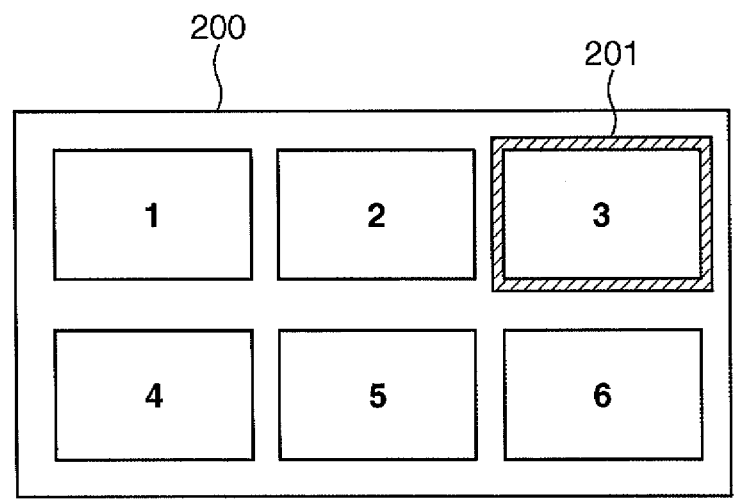
FIG. 5 is an explanatory illustration of an index screen according to exemplary embodiment of the present invention.

Next, an operation performed when the index button 42e is depressed is described. The index button 42e also implements the same function in the image capture mode as in the reproduction mode. In the image capture mode, the index screen is displayed during recording simultaneously with the recording operation being performed. When a user depress the index button 42e, as shown in FIG. 5, an index screen 200 is displayed on a liquid crystal panel 22a or an EVF (electronic view finder) 22b of the display unit 22. On the index screen 200, six thumbnails 1 to 6 of a captured video clip can be displayed at a time. Each video clip is composed of image data groups captured in the image capture mode. The capture of the image data groups starts by depressing the trigger button 42m and ends by depressing the trigger button 42m again. For example, on the disk medium 30, the video clip is recorded as a basic unit (chapter). The thumbnail images in each video clip are representative images of the video clip. For example, the thumbnail image is a first image captured at the beginning of the recording which is reduced to an appropriate size.

A frame 201 displayed in the index screen 200 is moved by rotating the multi-dial 42k, and a place to be positioned is determined by depressing the multi-dial 42k. That is, the user can select a desired video clip among the video clips by moving the frame 201 in the rotary operation of the multi-dial 42k. Then, the user can start reproduction of the video clip corresponding to the thumbnail framed by the frame 201 in the depressing operation of the multi-dial 42k. When the reproduction of the video clip is completed, the reproduction screen returns to the index screen 200. In order to exit the index screen 200, the index button 42e is depressed again. Also in the image capture mode, it is possible to perform the series of operations of selecting and reproducing the video clip on the index screen 200. Accordingly, it is possible to capture and record images without being interrupted even if the image capturing is being performed.

Turning to FIG. 1, the digital I/F 44 receives signals based on a standard such as IEEE 1394, or USB, and can be connected to an external device 50a via a cable such as the IEEE 1394, or the USB. The memory card 24 is a removable solid-state memory having a flash memory in it and capable of recording captured image data and audio data. The disk medium 30 can be an optical disk device such as a removable DVD, or a built-in hard disk device, and can record captured image data and audio data.

The power control unit 52 includes a battery detection circuit, a DC-DC converter, and a switching circuit for switching blocks to be powered, and can detect the type of the battery, the residual capacity of the battery, and whether a battery is connected. The battery 54 can be a lithium-ion battery, and can supply necessary electric power to each part of the video camera body 10.

The basic operation of the image capture mode and the reproduction mode according to the exemplary embodiment will now be described.

In the image capture mode, an optical image of an object enters into the image capture unit 14 through the lens unit 12. The focusing operation and the zooming operation of the lens unit 12 is controlled so as to control the amount of light entering into the image capture unit 14. The image capture unit 14 converts the entered optical image into an electrical signal and outputs the signal to the camera signal processing unit 16. The camera signal processing unit 16 converts the electrical signal output from the image capture unit 14 into a digital image signal, and at the same time, performs commonly known camera signal processes such as color separation, gray scale correction, or white balance adjustment. The audio signal control unit 34 performs gain control so as to control an audio signal input by the microphone 32 to attain a predetermined level, and outputs the signal as a digital signal.

The compression/decompression unit 18 compresses and encodes the image data output from the camera signal processing unit 16 and the audio data output from the audio signal processing unit 34 based on a predetermined compression-encoding method. The display unit 22 can include a liquid crystal panel 22a and an EVF 22b, and can display the captured image targeted for compression encoding in the compression/decompression unit 18. Further, the display unit 22 can display an operating state of the video camera body 10 as onscreen display information, if necessary.

In the image capture mode, when an instruction is given to perform recording by the operating section 42, the recording/reproducing unit 20 performs an error correction encoding process and a modulation process on the compressed and encoded data output from the compression/decompression unit 18. Further, the recording/reproducing unit 20 converts the data into an appropriate form for recording by adding synchronous code, an ID, or the like to the data, and records the data on a recording medium such as the disk media 30, or the memory card 24. During the process, the disk control unit 28 controls recording operations such as rotation of the disk medium 30, or a seek operation of a recording head. For the purpose of preventing disengagement of a disk servo due to a swing, shake, or shock to the body caused by an external force, a shock-proof memory is arranged between the disk medium 30 and the data bus 48.

Further, in the reproduction mode, when the user instructs a reproduction operation through the operating section 42, the recording/reproducing unit 20 performs a demodulation process and an error correction process on the data read from the disk medium 30 or the memory card 24. Then, the recording/reproducing unit 20 generates a clock synchronized with the reproduced data using a PLL circuit.

The compression/decompression unit 18 decompresses the compressed and encoded data reproduced by the recording/reproducing unit 20, and outputs the original image data and the audio data before the compression and the encoding is performed. The display unit 22 displays the image data restored in the compression/decompression unit 18.

Further, it is also possible to record AV (audio/video) data input from the outside in the recording mode. When the user instructs the CPU 40 to record the input data input from the digital I/F 44 through the operating section 42, the CPU 40 takes in the compressed image data and compressed audio data from the external device 50a via the digital I/F 44, and supplies the data to the recording/reproducing unit 20. As described above, the recording/reproducing unit 20 performs the error correction encoding process and the modulation process on the compressed image data and audio data, and records the data on a recording medium such as the disk medium 30, or the memory card 24.

When the user instructs the CPU 40 to record the input data input from the input/output unit 42 through the operating section 42, the CPU 40 controls the input/output unit 46 to convert the image signal and audio signal output from the external device 50b into digital data. The CPU 40 takes in the data which is then written on the memory 36. The CPU 40 thus compresses and encodes the image data and the audio data stored on the memory 36 using the compression/decompression unit 18, and supplies the compressed and encoded image data and audio data to the recording/reproducing unit 20. As described above, the recording/reproducing unit 20 performs the error correction encoding process and the modulation process on the compressed and encoded image data and audio data, and records the data on a recording medium such as the disk media 30, or the memory card 24.

Figure 6:
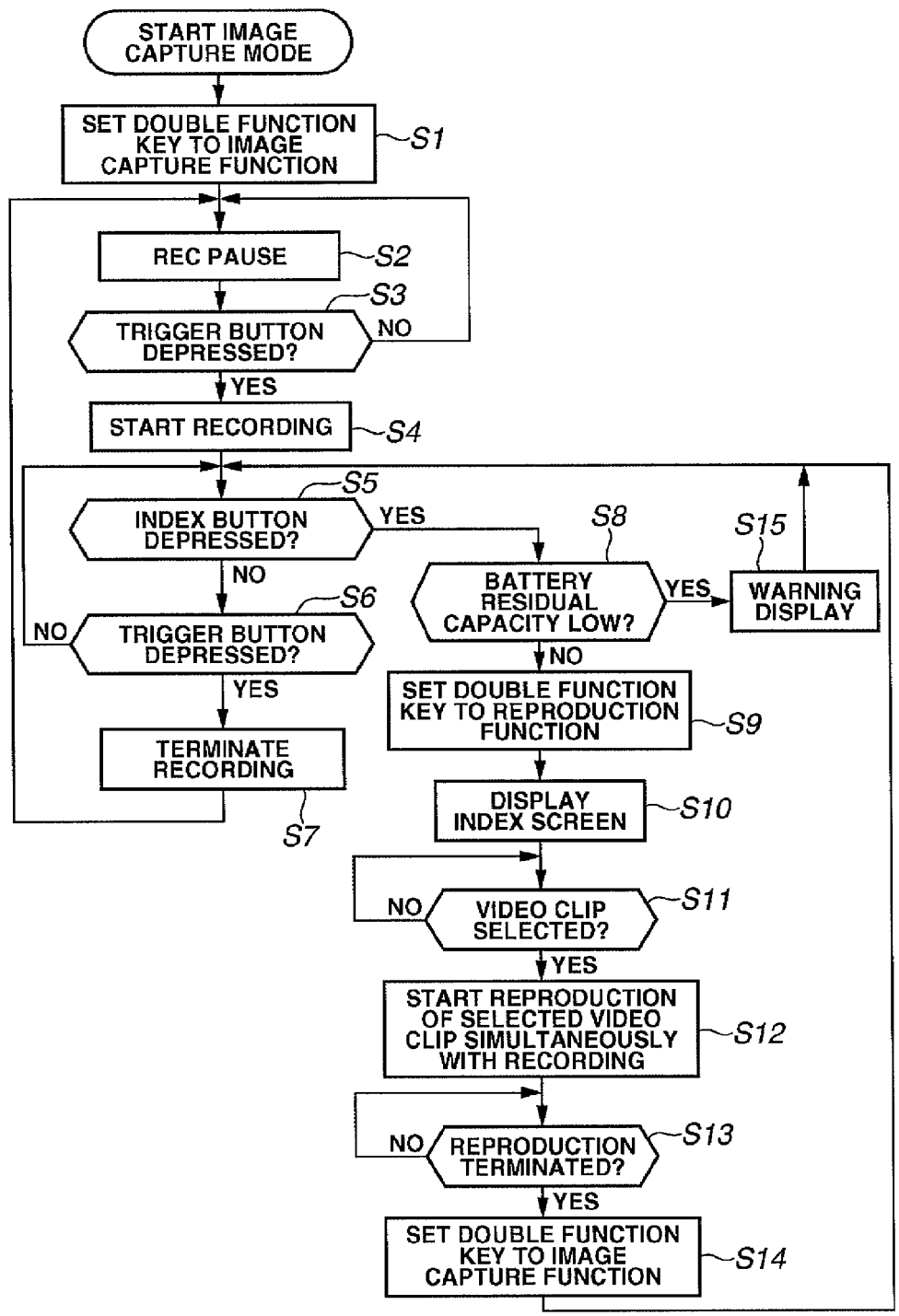
FIG. 6 is a flow chart illustrating a processing procedure in an image capture mode according to the exemplary embodiment of the present invention.

Characteristic operation in the image capture mode according to the exemplary embodiment will be described. FIG. 6 is a flowchart illustrating a processing in the image capture mode according to the exemplary embodiments of the present invention. In the exemplary embodiment, during recording in the image capture mode, it is possible to reproduce captured image data recorded at a certain position on the disk medium 30 or the memory card 24.

First, to start image capture, the user selects the image capture mode using the mode dial 42*l*. When the image capture mode is selected, functions of the double function keys 42*a* to 42*d* are set to the image capture function at step S1. To the double function keys 42*a* to 42*d*, different functions are assigned respectively in the image capture mode and in the reproduction mode. Then, the video camera body 10 is in the rec pause state in which the video camera stands by for recording while image capture is being performed at step S2. At step S3, depression of the trigger button 42*m* is monitored, and it is determined whether the trigger button 42*m* is depressed. When the trigger button 42*m* is depressed, it is determined that an instruction to start recording is given, and an image is recorded at step S4. At step S3, if the trigger button 42*m* is not depressed, the rec pause state is maintained.

When recording is started, the depression of the index button 42*e* is monitored, and it is determined whether the index button 42*e* is depressed at step S5. If the index button 42*e* is not depressed, the depression of the trigger button 42*m* is monitored again, and it is determined whether the trigger button 42*m* is depressed at step S6. At step S6, if the trigger button 42*m* is not depressed, the process returns to step S5 and the recording operation is maintained. If it is determined that the trigger button 42*m* is depressed at step S6 and an instruction to stop recording is given, the recording termination process is performed at step S7. After the recording termination process is completed at step S7, the process returns to step S2. At step S2, the status becomes the rec pause state, waiting for the next recording.

At step S5, if it is determined that the index button 42*e* is depressed, the power control unit 52 detects the residual capacity of the battery 54 at step S8. At step S8, if it is determined that the residual capacity of the battery 54 is so low that it is not appropriate to perform the reproduction operation simultaneously with recording, a warning is displayed on the liquid crystal panel 22*a* or the EVF 22*b* at step S15. After the warning is displayed, the process returns to step S5. The warning such as "Battery residual capacity low. Simultaneous recording and reproducing is prohibited." can be displayed. As a criterion in deciding whether the residual capacity of the battery 54 is low, for example, a threshold is set at the level of one-fifth of full-charged state, with which the battery residual capacity is compared to determine whether the battery residual capacity is low.

If it is determined that the battery residual capacity is not low at step S8, that is, electric power is sufficient for the simultaneous recording and reproduction, the reproducing operation is performed simultaneously with the image capturing and recording operation. At the time, functions of the double function keys 42*a* to 42*d* are set to the reproduction at step S9. Then, in order to display the index screen for reproduction, as described above, the index screen is displayed on the liquid crystal panel 22*a* or the EVF 22*b* at step S10.

At step S11, the process stands by until a video clip on the disk medium 30 or the memory card 24 to be reproduced is selected using the displayed index screen 200. When the video clip is selected, reproduction of the selected video clip is started together with recording at step S12. The reproduction continues until the reproduction of the selected video clip is completed at step S13. Thus, it is possible to perform recording while watching the reproduced image of the selected video clip on the liquid crystal display 22*a* or the EVF 22*b*. Also, it is possible to perform the reproduction function using the double function keys 42*a* to 42*d*. As an example of display on the liquid crystal display 22*a* or the EVF 22*b*, multi-screen display or a picture-in-picture style can be chosen to display the captured image and the reproduced image.

When the reproduction is completed at step S13, the reproduction operation is canceled, and the double function keys 42*a* to 42*d* are reset to the image capture function at step S14. Then, the process returns to step S5. Up to this point, the flow regarding the processing in the image capture mode has been described.

Next, characteristic operations in the reproduction mode according to the exemplary embodiment will be described. FIG. 7 is a flowchart illustrating a processing in the reproduction mode. In the exemplary embodiment, a captured image is recorded while image data recorded at a certain position on the disk medium 30 or the memory card 24 is being reproduced.

It is assumed that the user selects the reproduction mode using the mode dial 42l. When the reproduction mode is selected, functions of the double function keys 42a to 42d are set to the reproduction at step S201. Depression of the index button 42e is monitored, and it is determined whether the index button 42e is depressed at step S202.

When it is determined that the index button 42e has been depressed as described above, the index screen 200 is displayed as reproduction on the liquid crystal panel 22a or the EVF 22b at step S203. Then, at step S204, the process is in a stand-by state until a video clip on the disk medium 30 or the memory card 24 to be reproduced is selected on the displayed index screen 200.

If the video clip is selected at step S204, the reproduction of the selected video clip is started at step S205. After the reproduction is started, it is determined whether the trigger button 42m is depressed at step S206. If the trigger button 42m is not depressed, the reproduction continues until the reproduction of the selected video clip is completed at step S207. If the reproduction is not completed at step S207, the process returns to step S206 and the reproducing operation is maintained. If the reproduction is completed at step S207, the process returns to step S203, the index screen 200 is displayed in a stand-by state until the next video clip is selected.

If it is determined that the trigger button 42m is depressed during reproducing at step S206, the power control unit 52 detects the residual capacity of the battery 54 at step S208. If it is determined that the residual capacity of the battery 54 is so low at step S208 that it is not appropriate to perform the recording operation simultaneously with the reproduction, a warning is displayed on the liquid crystal panel 22a or the EVF 22b at step S209. After the warning is displayed, the process returns to step S206. The warning to be displayed can be, for example, the same expression as described in the processing procedure in the image capture mode. The battery residual capacity is also determined in the same manner as described in the image capture mode.

If it is determined that the battery residual capacity is not low at step S208, that is, electric power is sufficient to perform the reproduction and recording simultaneously, the image capturing and recording is performed together with the reproducing being performed. At the time, functions of the double function keys 42a to 42d are set to the image capture function at step S210. Then, the recording of the captured image is started simultaneously with the reproduction at step S211. Thus, it is possible to perform recording while watching the reproduced image of the selected video clip on the liquid crystal display 22a or the EVF 22b. Also, it is possible to perform the image capture function using the double function keys 42a to 42d. As an example of the display on the liquid crystal display 22a or the EVF 22b, a multi-screen display or a picture-in-picture style can be chosen to display the captured image and the reproduced image.

At step S212, depression of the trigger button 42m is monitored, and it is determined whether the trigger button 42m is depressed. When it is determined that the trigger button 42m is depressed at step S212, it is determined that an instruction to terminate recording is given, and recording termination process is performed at step S213. At the time, the functions of the double function keys 42a to 42d are reset to the reproduction function at step S214, and the process returns to step S206. Up to this point, the flow regarding the processing procedures in the reproduction mode has been described.

As described above, the functions of the double function keys 42a to 42d are temporarily switched from the image capture to the reproduction in response to the selection of the reproduction in the image capture mode. Accordingly, it is possible to perform operations necessary for reproduction even in the image capture mode, and also to reproduce the captured data recorded on a recording medium.

Further, the functions of the double function keys 42a to 42d are temporarily switched from the reproduction to the image capture in response to the selection of the image capturing in the reproduction mode. Therefore, it is possible to perform operations necessary for image capturing even in the reproduction mode, and to record the captured image. Accordingly, it is not necessary to provide special operating sections for the image capturing and the reproduction respectively, so that the downsizing and weight saving of the video camera body can be achieved.

Further, according to the exemplary embodiment, if the battery residual capacity is low, it is prohibited to simultaneously perform the recording and the reproduction. The increase of power consumption is caused by performing the recording and reproduction simultaneously and thereby the battery residual capacity is reduced to zero. Accordingly, in the present embodiment, a case where both of the recording and the reproduction is terminated halfway can be prevented.

The above exemplary embodiment is applied to the video camera. However, the present invention can be also applied to digital still cameras, or video recorders equipped with a camera device employing recording media other than the above described recording media.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A recording apparatus capable of performing a reproducing operation in a recording mode, comprising:
a recording unit configured to record image data on a recording medium;
a reproducing unit configured to reproduce image data recorded on the recording medium;
a mode selection switch selecting one of the recording mode and a reproduction mode;
a predetermined switch different from the mode selection switch, capable of instructing performing the reproducing operation in the recording mode;
a double-functional operating key capable of performing different operations depending on one of the recording mode and the reproduction mode respectively; and
a controller controlling the recording unit and the reproducing unit in response to an operation of the double-functional operating key,
wherein, while the recording mode selected by the mode selection switch, if the reproducing operation is started up in response to an instruction generated by the predetermined switch, and
wherein the controller switches a function of the double-functional operating key so that the operation of the double-functional operating key becomes effective for the reproduction mode, and in response to canceling of the reproducing operation in the recording mode, the controller switches the function of the double-functional operating key so that the operation of the double-functional operating key becomes effective for the recording mode selected by the mode selection switch.

2. The apparatus according to claim 1, wherein the predetermined switch is for instructing an index screen reproduction for the image data recorded in the recording medium during the recording mode.

3. A reproducing apparatus capable of performing a recording operation in a reproduction mode, comprising:
a recording unit configured to record image data on a recording medium;
a reproducing unit configured to reproduce image data recorded on the recording medium;
a mode selection switch selecting one of a recording mode and the reproduction mode;
a predetermined switch different from the mode selection switch, capable of instructing performing the recording operation in the reproduction mode;
a double-functional operating key capable of performing different operations depending on one of the recording mode and the reproduction mode respectively; and
a controller controlling the recording unit and the reproducing unit in response to an operation of the double-functional operating key,
wherein, while the reproduction mode selected by the mode selection switch, if the recording operation is started up in response to an instruction generated by the predetermined switch, and
wherein the controller switches a function of the double-functional operating key so that the operation of the double-functional operating key becomes effective for the recording mode, and in response to canceling of the recording operation in the reproduction mode, the controller switches the function of the double-functional operating key so that the operation of the double-functional operating key becomes effective for the reproduction mode selected by the mode selection switch.

4. The apparatus according to claim 3, wherein the predetermined switch is a trigger button for instructing image data recording to the recording medium during the reproduction mode.

5. An image capturing apparatus capable of performing a reproducing operation in an image capturing mode, comprising:
a camera unit configured to capture an image of an object and to generate an image data;
a recording unit configured to record the image data on a recording medium;
a reproducing unit configured to reproduce image data recorded on the recording medium;
a mode selection switch selecting one of the image capturing mode and a reproduction mode;
a predetermined switch different from the mode selection switch, capable of instructing performing the reproducing operation in the image capturing mode;
a double-functional operating key capable of performing different operations depending on one of the image capturing mode and the reproduction mode respectively; and
a controller controlling the camera unit and the reproducing unit in response to an operation of the double-functional operating key,
wherein, while the image capturing mode selected by the mode selection switch, if the reproducing operation is started up in response to an instruction generated by the predetermined switch, and
wherein the controller switches a function of the double-functional operating key so that the operation of the double-functional operating key becomes effective for the reproduction mode, and in response to canceling of the reproducing operation in the image capturing mode, the controller switches the function of the double-functional operating key so that the operation of the double-functional operating key becomes effective for the image capturing mode selected by the mode selection switch.

6. The apparatus according to claim 5, wherein the predetermined switch is for instructing an index screen reproduction for the image data recorded in the recording medium during the image capturing mode.

* * * * *